United States Patent
Banal

(10) Patent No.: US 7,286,322 B2
(45) Date of Patent: Oct. 23, 2007

(54) INFORMATION FIELD INTEGRALLY FORMED BY DISKETTE HOUSING TO BE RECEPTIVE TO HANDWRITTEN INDICIA

(75) Inventor: Anthony O. Banal, Fergus Falls, MN (US)

(73) Assignee: Imation Corp., Oakdale, MN (US)

( * ) Notice: Subject to any disclaimer, the term of this patent is extended or adjusted under 35 U.S.C. 154(b) by 413 days.

(21) Appl. No.: 10/902,309

(22) Filed: Jul. 28, 2004

(65) Prior Publication Data

US 2006/0023356 A1    Feb. 2, 2006

(51) Int. Cl.
G11B 23/02 (2006.01)
G11B 23/03 (2006.01)
(52) U.S. Cl. .................. 360/132; 360/133; 720/726
(58) Field of Classification Search .................. None
See application file for complete search history.

(56) References Cited

U.S. PATENT DOCUMENTS

| | | | |
|---|---|---|---|
| 4,644,435 A | 2/1987 | Nemoto et al. | |
| 5,631,792 A | 5/1997 | Carlson et al. | |
| 5,748,419 A | 5/1998 | Langseth et al. | |
| 5,775,493 A * | 7/1998 | Cragun ..................... | 206/308.3 |
| 5,812,351 A | 9/1998 | Wulfing et al. | |
| 5,980,791 A | 11/1999 | Berscheid et al. | |
| 6,215,620 B1 | 4/2001 | Dunbar et al. | |
| 6,349,087 B1 * | 2/2002 | Okamoto et al. ........... | 720/720 |
| 6,473,266 B1 | 10/2002 | Turchin et al. | |
| 6,885,521 B2 * | 4/2005 | Kikuchi ..................... | 360/133 |
| 6,922,312 B2 * | 7/2005 | Oishi ........................ | 360/133 |

* cited by examiner

Primary Examiner—A. J. Heinz
(74) Attorney, Agent, or Firm—Eric D. Levinson

(57) ABSTRACT

A method of presenting a data storage diskette to a user is disclosed. The method includes the steps of providing the diskette and promoting that handwritten indicia be deposited directly onto an information field in labeling the diskette. In this regard, the diskette includes a housing defining first and second housing sections, and an exterior portion of at least one of the housing sections integrally forming the information field.

16 Claims, 4 Drawing Sheets

INFORMATION FIELD INTEGRALLY FORMED BY DISKETTE HOUSING TO BE RECEPTIVE TO HANDWRITTEN INDICIA

THE FIELD OF THE INVENTION

The present invention relates to data storage diskettes, and more particularly, to a data storage diskette housing having an integrally formed information field.

BACKGROUND OF THE INVENTION

Data storage diskettes have been employed for decades in computer systems. Data storage diskettes are also known as floppy disks. These floppy disks permit information to be written to the disk, and information to be read from the disk, in such a manner that floppy disks have become a widely popular storage medium in computer systems.

With the above in mind, a data storage diskette generally consists of an outer shell or housing maintaining a media disk. The media disk is a flexible sheet of polyester film or the like having a magnetic layer coated on at least one side. The housing normally includes a separate cover and a separate base. Together, the cover and the base each form openings, or media access windows, at a forward portion of the housing. The media access windows facilitate access to the media disk by a read/write head when the data storage diskette is inserted into a floppy disk drive. The disk drive spins the media disk for selective access by the read/write head to data tracks on the media disk. To this end, a hub is centered on the media disk and projects through a central aperture of the housing to enable the disk drive to couple with the media disk. In addition, a movable shutter is coupled to the housing and covers the media access windows. The shutter is typically biased to a closed position to protect the media disk from exposure to the elements. The movable shutter can be slid to an open position to permit access to the media disk by the read/write head of the floppy disk drive.

During use, information is read from, or written to, the magnetic layer on the media disk by the read/write head. In particular, the floppy disk drive couples to the hub on the media disk and spins the media disk for selective access to various tracks along the circumference of the media disk (i.e., data tracks). The read/write head traverses with the media disk to magnetically read (or write) information from (or to) the media disk. In this regard, the media disk is a repository for storing user-selected information. In this manner, the non-volatile storage of information on the media disk can be retained for many years. With the above in mind, most data storage diskette users have a desire to place written information on the diskette housing to readily identify the data stored on the media disk, thus facilitating future reference to the stored data.

Many prior art diskette housings are black to block light transmission so that optical sensors in the disk drives can sense the presence of the inserted diskettes. Black diskette housings do not permit writing deposited directly onto the housing to be visible. With the advent of mechanical disk drive sensors, recent prior art diskette housings are offered in any of a variety of colors, as the mechanical sensors are indifferent to the housings' ability to block light transmission. However, even these colored diskette housings are ill suited for the direct placement of writing onto their surfaces as the writing can smear, or worse, rub off.

With the above description in mind, paper labels are typically employed to identify a diskette (i.e., label the diskette). The paper label normally has an adhesive coating on one side, for example, on a backside, such that the paper label can be pasted to the housing exterior. The adhesive paper label is often delivered on a release liner as a separate item apart from the diskette. In this manner, the separate paper labels can be included with the data storage diskette, or more likely, within a box or other packaging containing multiple data storage diskettes. With this in mind, a user of the prior art data storage diskettes labels an individual diskette by first writing information onto the paper label, removing the paper label from the release liner, and finally affixing the adhesive side of the paper label to an exterior surface of the data storage diskette housing.

Labels for data storage diskettes have a number of drawbacks. For example, during application of the paper label, the label can become creased, thus forming a ridge in the paper label. The crease (or ridge) in the paper label can interfere with the disk drive during a read/write operation. In addition, affixing the paper label to the diskette housing necessitates an accurate placement of the label. For example, the label must be placed on the data storage diskette housing such that it does not interfere with the hub projecting through the central aperture of the housing. Moreover, inaccurate or ineffective placement of the paper label on the diskette housing can result in the label falling off, thus failing to identify the information stored on the media disk. Furthermore, each adhesive label has a measurable cost that contributes to an increase in the unit cost of each data storage diskette or multiple diskette package.

Data storage diskettes continue to be popular data storage devices for transferring information between computer systems. Data storage diskettes are capable of containing vast volumes of information stored in a durable and retrievable manner. To effectuate retrieval of the stored information, labeling of the diskette should be durable and cost efficient. With this in mind, a need exists for an effective, durable and cost efficient manner of labeling the information contained in a data storage diskette.

SUMMARY OF THE INVENTION

One aspect of the present invention is related to a method of presenting a data storage diskette to a user. The method includes the step of providing the diskette. To this end, the diskette includes a housing defining first and second housing sections, an exterior portion of at least one of the housing sections integrally forming an information field. The method additionally includes the step of promoting that handwritten indicia be deposited directly onto the information field in labeling the diskette.

Another aspect of the present invention is related to a data storage diskette. The data storage diskette includes a diskette housing and a media disk enclosed within the housing. The housing defines first and second housing sections, and an icon formed on the housing. An exterior portion of at least one of the housing sections integrally forms an information field. In this regard, the icon indicates that the integrally formed information field is receptive to hand written indicia.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION OF THE PREFERRED EMBODIMENTS

Figure 1:
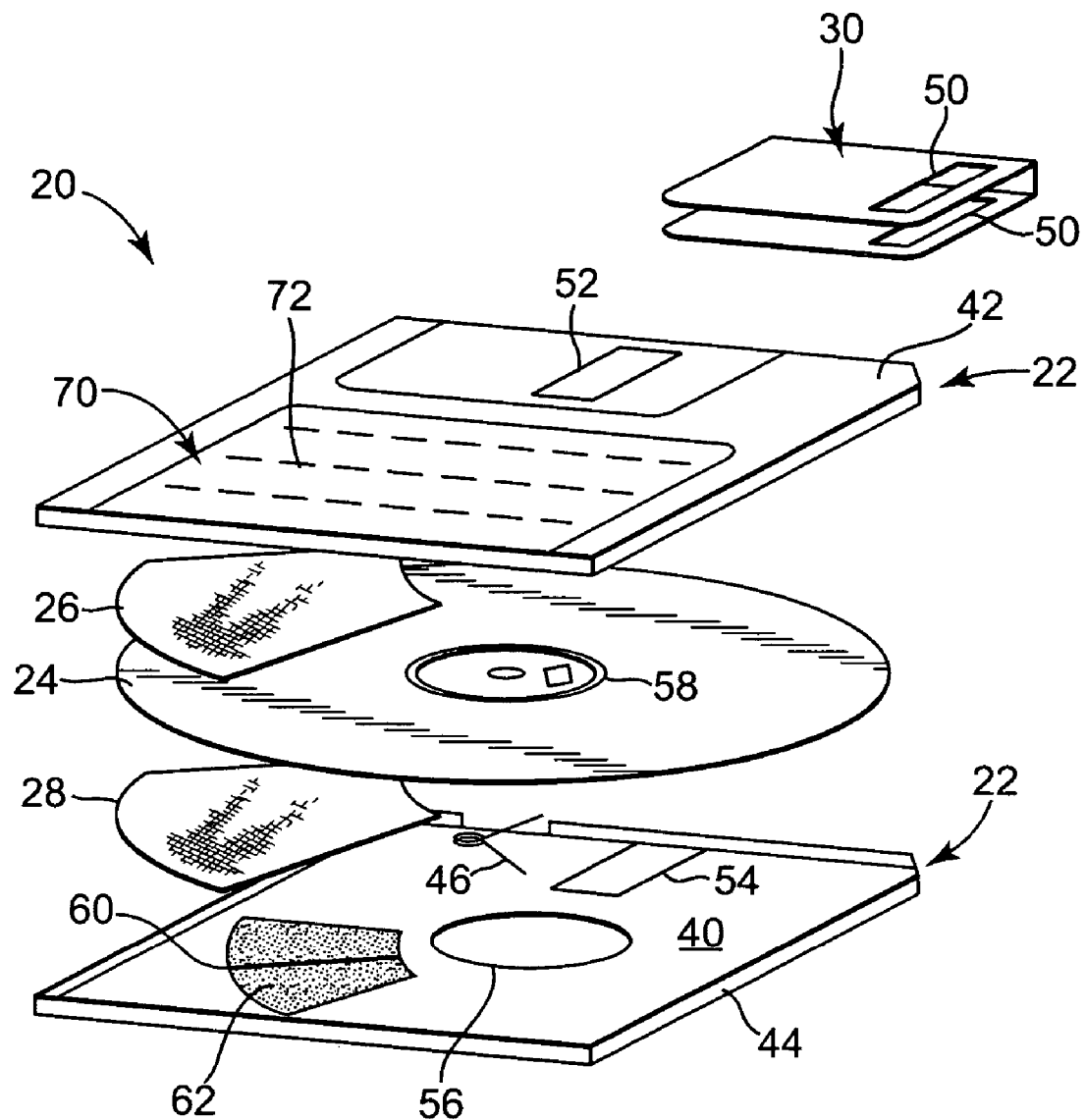
FIG. 1 is a perspective, exploded view of a data storage diskette according to one embodiment of the present invention.

An exemplary data storage diskette according to one embodiment of the present invention is illustrated at 20 in FIG. 1. Generally, the data storage diskette 20 includes a housing 22, a media disk 24, a first fabric liner 26, a second fabric liner 28, and a shutter 30. When assembled, the media disk 24 is disposed in a media compartment 40 within the housing 22.

The housing 22 is sized for reception by a typical disk drive (not shown). In this regard, one form factor for the housing 22 is a 3.5 inch form factor that has found great acceptance in the computer system field, but should not be read as limiting the invention. Thus, in one embodiment, the housing 22 exhibits a size of approximately 3.5×3.5×0.125 inches, although other dimensions are equally acceptable. With this in mind, the housing 22 is defined by a first housing section 42 and a second housing section 44. In one embodiment, the first housing section 42 forms a cover whereas the second housing section 44 forms a base. As used throughout the specification, directional terminology such as "cover," "base," "upper," "lower," "top," "bottom," etc., is employed for purposes of illustration only and is no way limiting.

The first and second housing sections 42 and 44, respectively, are sized to be reciprocally mated to one another to form the media compartment 40. In this regard, when the first housing section 42 and the second housing section 44 are coupled together, the shutter 30 mechanically couples about the housing 22. A spring 46 projects from the housing 22 and couples with the shutter 30 such that the shutter 30 is movable. The shutter 30 defines opposed shutter windows 50 that are configured to align when moved with a first media access window 52 formed in the first housing section 42, and a second media access window 54 formed in the second housing section 44.

In addition to forming the second media access window 54, the second housing section 44 also forms a central opening 56. The central opening 56 facilitates access to the media disk 24 by a drive portion of the disk drive (neither shown). During use, the drive portion of the disk drive enters through the central opening 56 to engage with a hub 58 centered on the media disk 24. In this manner, the disk drive couples with the hub 58 and spins the media disk 24 for selective access to media tracks distributed on the media disk 24.

The spinning media disk 24 can attract debris that will potentially interfere with the read/write process. To this end, the liners 26, 28, although optional, are provided in an exemplary embodiment. Therefore, to address the possibility of deleterious debris build-up, in one embodiment the second housing section 44 optionally defines a lifter 60 and a plurality of projections 62 that are formed within the media compartment 40. As the media disk 24 rotates, the lifter 60 causes the second fabric liner 28 to rub against the media disk 24, thereby cleaning the media disk 24 during use.

The media disk 24 is of a type commonly known in the art and includes a coating of a slurry of magnetic particles on at least one side. For example, the media disk 24 can be a polyester-based film coated on one side with a layer of magnetic material dispersed within a suitable binder system. Acceptable media disks are available, for example, from Imation Corp., of Oakdale, Minn.

The first housing section 42 homogeneously defines an integrally formed information field 70 on an exterior portion thereof, although other locations for placement of the information field 70 on the housing 22 are equally acceptable. As more fully described below, the integrally formed information field 70 defines a writing surface 72 that is receptive to a variety of inks and waxes as are beneficially employed in writing instruments to deposit indicia.

Figure 2:
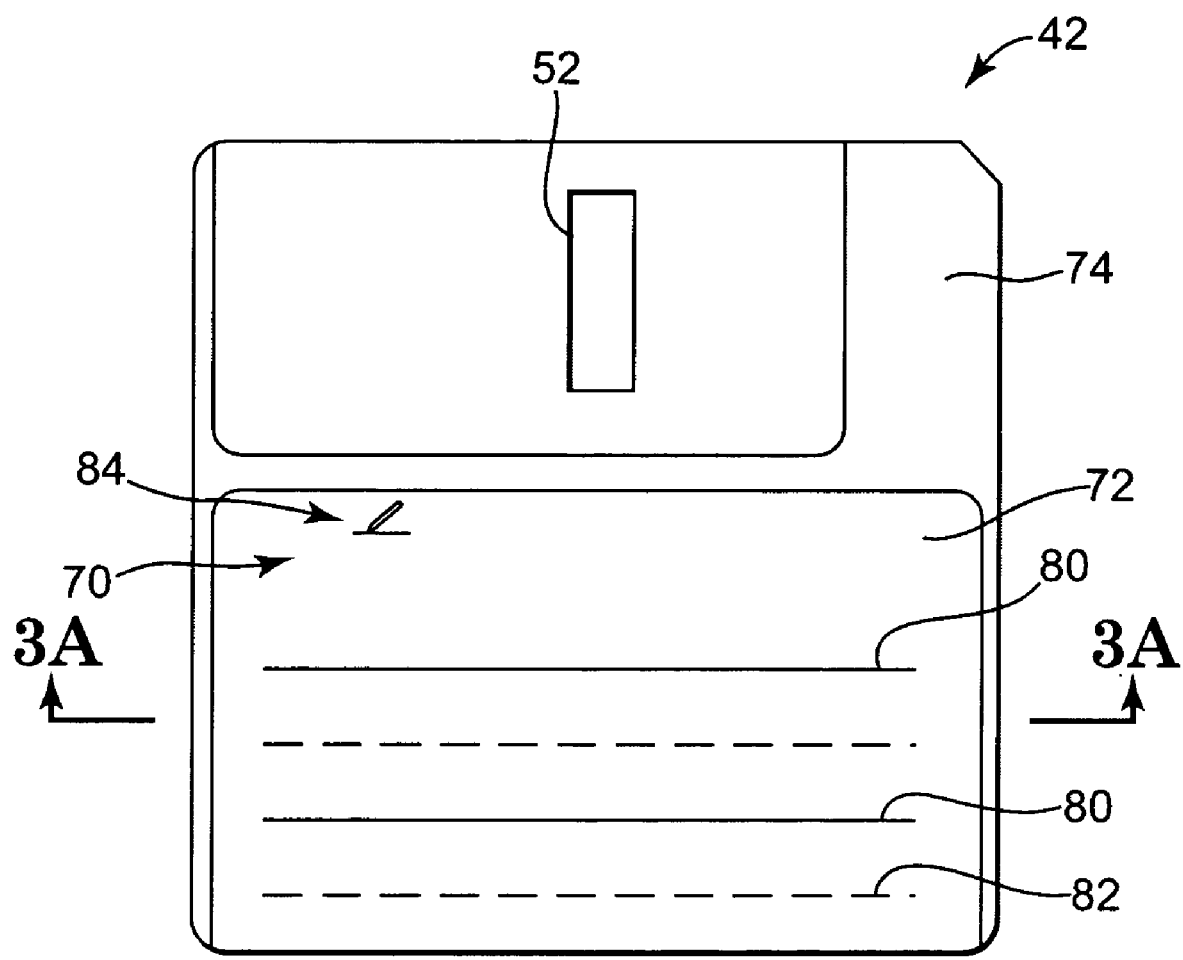
FIG. 2 is a top view of a housing section of the data storage diskette shown in FIG. 1 illustrating an information field having an icon according to one embodiment of the present invention.

FIG. 2 is a top view of the first housing section 42. The first housing section 42 is isolated from the other components of the data storage diskette 20 such that the shutter 30 (FIG. 1) is not shown in FIG. 2, and the first media access window 52 is unobstructed. The integrally formed information field 70 is molded into an exterior portion 74 of the first housing section 42. In one embodiment, the integrally formed information field 70 defines the writing surface 72, first ruled line segments 80, a second ruled line segment 82, and an icon 84.

The information field 70 is shown as a generally rectangular field integrally formed into the first housing section 42. However, the information field 70 can be formed into either of the first housing section 42 or the second housing section 44 (FIG. 1), and can define a variety of plan forms such as squares, ovals, circles, or other geometric shapes. The first ruled line segments 80 are illustrated as continuous line segments, and the second ruled line segments 82 are illustrated as dashed line segments, although variations and combinations of dots and lines and curves are equally acceptable for either of the line segments 80, 82. In one embodiment, the ruled line segments 80, 82 are formed to project above the writing surface 72. In an alternate embodiment, the ruled line segments 80, 82 are molded (i.e., indented) into the writing surface 72. The icon 84 is preferably formed on the information field 70 and is a visual guide indicating that the integrally formed information field 70 is receptive to handwritten indicia. In this regard, the icon 84 can represent, for example, a pen placed to paper, or other visual guides indicating that the information field 70 is receptive to handwritten indicia.

Figure 3A:
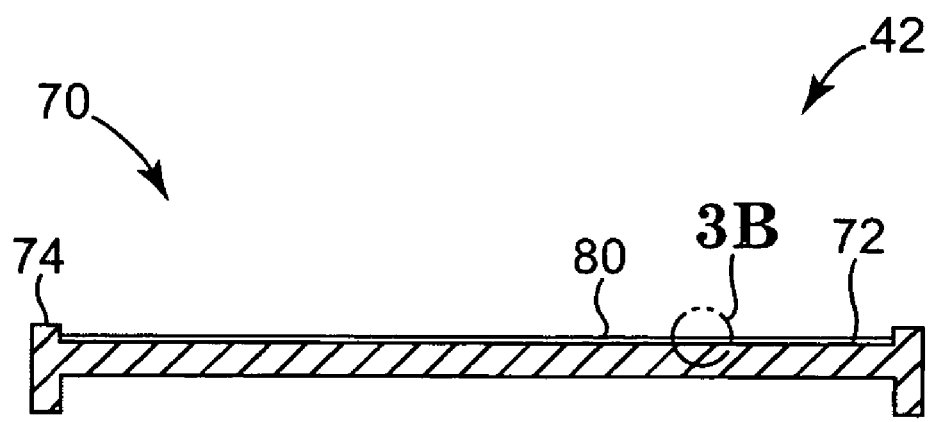
FIG. 3A is a cross-sectional view of the housing section taken through the information field shown in FIG. 2.

FIG. 3A is a cross-sectional view of the first housing section 42 shown in FIG. 2. In the instant embodiment, the information field 70 is integrally formed into the exterior portion 74 of the first housing section 42 and defines the writing surface 72. In one embodiment, the ruled line segment 80 is formed on the information field 70 to project above the writing surface 72.

Figure 3B:
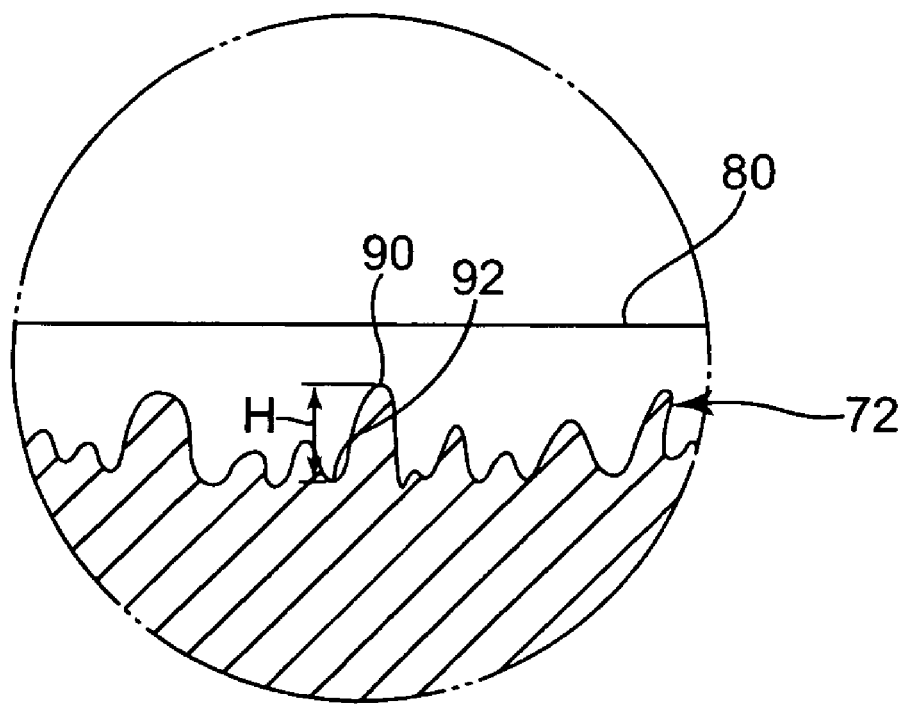
FIG. 3B is a microscopic view of a writing surface of the information field shown in FIG. 3A.

FIG. 3B is a microscopic view of the writing surface 72 shown in FIG. 3A. The microscopic view depicts the ruled line segment 80 projecting above the writing surface 72. In addition, the writing surface 72 defines a textured surface having peaks 90 and valleys 92. As a point of reference, while the ruled line segment 80 is represented in FIG. 3B as microscopically linear for ease of illustration, it should be understood that the ruled line segment 80 could also incorporate a textured surface, much like the illustrated texture of the writing surface 72. Having said this, in a preferred embodiment the ruled line segment 80 is substantially smooth and functions to guide a deposition of indicia unto the writing surface 72.

As employed throughout the Specification, the term "peak" references a local maxima and the term "valley" references a local minima of the writing surface 72. With this in mind, for each local maxima and minima, for example, the peak 90 and the valley 92, a height H represents the distance between the maxima and the minima. A root-mean-square (RMS) surface roughness $R_a$ is defined relative to a position of the peaks 90 and the valleys 92. The RMS surface roughness $R_a$ is a calculation known in the art and is computed by algebraically squaring a relative position of each peak 90 and each valley 92; averaging the algebraic squares for all peaks 90 and all valleys 92; and taking the square root of the average of all algebraic squares. With this in mind, the RMS surface roughness $R_a$ of the writing surface 72 can be quantified and represents the variation in smoothness over the writing surface 72.

Large values of surface roughness $R_a$ correspond to large average distances between the peaks 90 and the valleys 92 (i.e., large heights H). Conversely, a small value of surface roughness $R_a$ indicates a comparatively smaller average value in the heights H and corresponds to a smoother surface. As an example, a RMS surface roughness $R_a$ of zero indicates that the writing surface 72 is ideally smooth (i.e., having no peaks and no valleys). In contrast, a RMS surface roughness of 0.001 inch indicates the writing surface 72 has a comparatively rough surface with the average peak 90 projecting above the average valley 92 by an average height H of 0.001 inch. In addition, the surface roughness $R_a$ of the writing surface 72 is proportional to a surface area of the writing surface 72. To this end, writing surfaces 72 that have high values of surface roughness $R_a$ also have high surface areas that are characterized by an ability to capture and retain inks and/or waxes, such that written indicia deposited onto the writing surface 72 are durably retained and resist smearing.

With the above discussion in mind, the receptivity of the writing surface 72 to written indicia is accomplished in at least two manners, including a mechanical capturing of the indicia and an energetic capturing of the indicia. In one embodiment, the writing surface 72 defines a surface roughness $R_a$ in the range from 100 to 250 micro-inches to mechanically capture written indicia. In a preferred embodiment, the writing surface 72 is textured to have a surface roughness $R_a$ in the range of approximately 150 to 180 micro-inches to mechanically capture written indicia. Writing surfaces 72 having a surface roughness in the range from 100 to 250 micro-inches have surprisingly resulted in the mechanical capture of ink, waxes, and lead delivered from pens, markers and pencils such that the captured indicia resists smearing. In particular, the peaks 90 and the valleys 92 combine to form troughs and increase the surface area of the writing surface 72. The troughs and increased surface area of the writing surface 72 facilitate a durable mechanical capture of written indicia from a broad range of writing instruments. As a consequence, the writing surface 72 is receptive to and legibly binds aqueous inks, non-aqueous inks, wax in general, and pencil lead.

With regard to the energetic capturing of the indicia 102, the writing surface 72 preferentially bonds by energetic means the inks, wax, and lead deposited by writing instruments onto the writing surface 72. Specifically, in one embodiment, the writing surface 72 is configured to have a surface energy of greater than 35 dyne/cm such that inks, wax, and lead placed onto the writing surface 72 are durably bonded thereto. As a point of reference, all liquids have a surface tension. The surface tension of a liquid drop is defined to be a tangential force within the drop that binds the liquid together at an air/liquid interface. Intermolecular forces of attraction between molecules in the liquid bind the liquid into the "drop" form. This intermolecular force of attraction between molecules in a liquid can be expressed as a surface tension in the units of dyne/cm. In addition, solid (for example, plastic) substrates also have a characteristic surface energy. When the surface energy of a solid substrate is much greater than the surface tension of the liquid drop placed on the substrate, the liquid drop will adhere to the plastic substrate and is said to "wet out" the substrate.

With the above discussion in mind, in one embodiment the housing sections 42, 44 are formed of a plastic material selected to have a surface energy of greater than 35 dyne/cm. Plastic material having suitable surface energy values after formation into the housing sections 42, 44 include, but are not limited to, polystyrene, acrylonitrile butadiene styrene (ABS), polyamides in general, polyester, polyvinyl chloride, polycarbonate, polysulfone, polyethersulfone, and blends and combinations of the stated plastic materials. In another embodiment, plastic material is formed into the housing sections 42, 44 and treated in a plasma process that increases the initial surface energy of the housing sections 42, 44 to a value greater than 35 dyne/cm, preferably increasing the initial surface energy of the housing sections 42, 44 to a value greater than 60 dyne/cm. The plasma process modifies the outermost surface of the plastic material, for example, the outermost 1000 Angstroms of the exterior 74 of the first housing section 42 including the information field 70, by exposing the surface to a gas plasma. A gas plasma is a partially ionized gas that is introduced to the plastic material in a contained vacuum chamber. The gas plasma interacts with the plastic material and energizes the surface without altering the bulk properties of the plastic material. In this manner, housing sections 42, 44 forming the information field 70 are modified to have a surface energy of greater than 35 dyne/cm, preferably greater than 60 dyne/cm, such that liquids (i.e., inks and waxes) delivered from pens will preferentially adhere to the writing surface 72. To this end, the writing surface 72 can be ideally smooth and still energetically capture and durably retain written indicia deposited onto the writing surface 72.

The data storage diskette 20 has been described as including the housing sections 42, 44 integrally forming the information field 70 and defining the writing surface 72 that is receptive to handwritten indicia. With this in mind, it is desirable that the handwritten indicia be visible. To this end, in one embodiment the housing 22 is formed to be opaque such that inks, waxes, and lead deposited onto the writing surface 72 are visible. An opaque housing 22 is characterized as having a natural hue (i.e., not colored). Alternately, the housing is formed and colored to contrast with the written indicia. The housing 22 can be colored by the addition of pigments or dyes to the plastic material prior to forming the housing 22. In this manner, the written indicia deposited onto the writing surface 72 contrasts with the color of the writing surface 72 and are visible.

Figure 4:
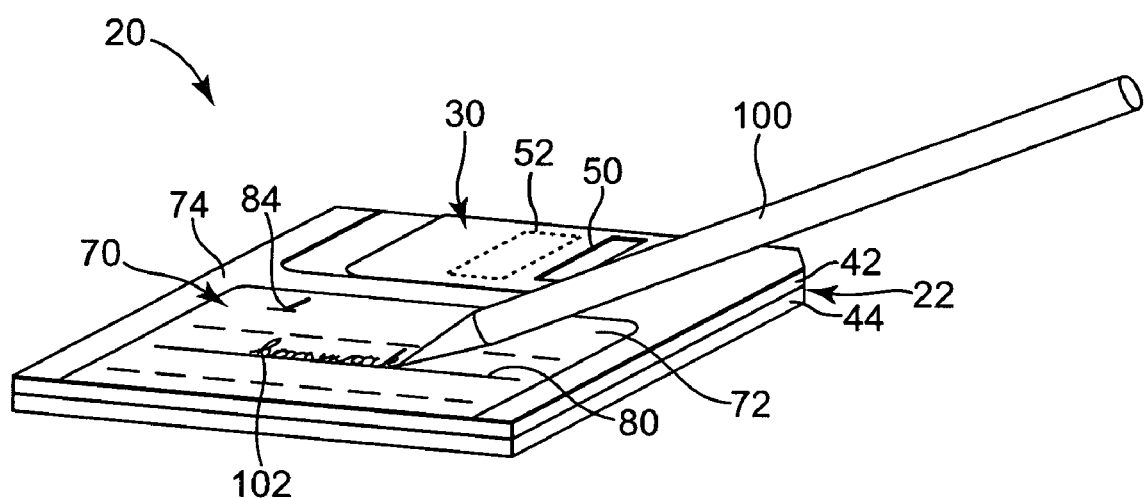
FIG. 4 is a perspective view of an assembled data storage diskette illustrating a stylus employed to write indicia onto an information field in accordance with embodiments of the present invention.

FIG. 4 is an assembled data storage diskette 20 according to one embodiment of the present invention. The assembled diskette 20 includes the first housing section 42 attached to the second housing section 44 and the shutter 30 mechanically coupled about the housing sections 42, 44. The shutter 30 is movable such that the shutter windows 50 (one shown)

can be displaced to align with the media access windows 52, 54 (the first media access window 52 is shown in ghost outline under the shutter 30). As illustrated, the shutter 30 is biased to the closed position such that the media disk (not visible) is not exposed to the environment. The information field 70 is integrally formed into the exterior 74 of the first housing section 42. The information field 70 includes the writing surface 72 and the ruled line segment 80.

An exemplary use of the data storage diskette 20 will be described with reference to FIG. 4. The diskette 20 is provided to a user (not shown) and includes a housing 22 defining the first housing section 42 and the second housing section 44. An exterior portion 74 of the first housing section 42 integrally forms information field 70. A stylus 100 is depicted depositing indicia 102 onto the writing surface 72. In this regard, a user (not shown) has been informed by the icon 84 that the writing surface 72 is receptive to indicia 102 delivered from the stylus 100. To this end, the stylus 100 can be any one of an ink pen, a pencil, a wax pen, a marker, a ballpoint pen, a felt-tip pen, an indelible marker, a permanent marker, an erasable ink pen, a roller ball pen, or a fountain pen.

During use of the diskette 20, and in particular during labeling of the diskette 20, the user is prompted to handwrite indicia 102 directly onto the information field 70 in labeling the diskette 20. To this end, the icon 84 prompts the user that the writing surface 72 is receptive to handwritten indicia 102. In one embodiment, the icon 84 represents a pen contacting a tablet. In an alternate embodiment, the icon 84 includes text formed into the information field 70. In any regard, the icon 84 informs the user that the integrally formed information field 70, and in particular the writing surface 72, is receptive to handwritten indicia 102.

The data storage diskette 20 can be provided in a variety of forms. For example, a plurality of data storage diskettes 20 can be provided in a box (not shown) suited for retail sale. In this regard, the box can include advertisement indicating an absence of the known paper labels, and promoting that handwritten indicia 102 be deposited directly onto the writing surface 72.

The diskette 20 promotes handwritten indicia 102 deposited directly onto the writing surface 72 in a variety of manners, for example, by the presence of the icon 84 on the information field 70, and by the presence of the line segments 80. The line segments 80 can be continuous lines (or with reference to FIG. 2, the line segments 82 can be dashed lines). In any regard, the presence of the icon 84 indicating that the writing surface 72 is receptive to handwritten indicia and the presence of the line segments 80, 82 each promote labeling of the diskette 20 without employing a paper label.

In labeling the diskette 20, the use of separate labels (i.e., paper labels) is eliminated. Instead, the diskette 20 according to one embodiment of the present invention is distinguished from prior art diskettes in that the writing surface 72 is receptive to hand written indicia 102 deposited from any one of a variety of writing instruments.

Although specific embodiments of preferred diskette housing information fields have been illustrated and described, it will be appreciated by those of ordinary skill in the art that a wide variety of alternate and/or equivalent implementations could be substituted for the specific embodiments shown and described without departing from the scope of the present invention. Those with skill in the chemical, mechanical, electromechanical, electrical, and computer arts will readily appreciate that the present invention can be implemented in a wide variety of embodiments. This application is intended to cover any adaptations or variations of diskette housings having integrally formed information fields permitting indicia to be written onto the field without the use of a separate label. Therefore, it is manifestly intended that this invention be limited only by the claims and their equivalents.

What is claimed is:

1. A method of presenting a data storage diskette to a user, the method comprising:

providing the diskette, the diskette including a housing defining first and second housing sections, an exterior portion of at least one of the housing sections integrally forming an information field;

energetically capturing hand written indicia on a writing surface of the information field by providing the writing surface with a surface energy characterized by a surface tension value of greater than 35 dyne/cm; and promoting that handwritten indicia be deposited directly onto the information field in labeling the diskette.

2. The method of claim 1, further comprising:

handwriting indicia onto the information field with an ink pen;

wherein the handwritten indicia are legibly bound to the information field and resist smearing.

3. The method of claim 1, wherein energetically capturing hand written indicia includes providing the writing surface with texture to mechanically capture hand written indicia.

4. The method of claim 3, wherein the textured writing surface defines a surface roughness in the range from 100 to 250 micro-inches.

5. The method of claim 1, wherein providing the diskette includes providing a plurality of diskettes in a box, the diskettes and contents of the box characterized by an absence of paper labels.

6. The method of claim 5, wherein the box advertises that each of the diskettes includes an information field receptive to handwritten indicia.

7. The method of claim 1, wherein promoting that handwritten indicia be deposited directly onto the information field includes providing ruled line segments formed into the information field.

8. The method of claim 1, wherein promoting that handwritten indicia be deposited directly onto the information field includes providing an icon on the housing, the icon indicating that the integrally formed information field is receptive to hand written indicia.

9. The method of claim 1, wherein promoting that handwritten indicia be deposited directly onto the information field includes prompting the user to handwrite indicia onto the information field without employing a separate label.

10. The method of claim 1, wherein promoting that handwritten indicia be deposited directly onto the information field includes coloring the diskette housing to contrast with a color of the handwritten indicia.

11. The method of claim 1, further comprising:

handwriting indicia directly onto the information field with a stylus selected from the group consisting of an ink pen, a pencil, a wax pen, a marker, a ballpoint pen, a felt-tip pen, an indelible marker, a permanent marker, an erasable ink pen, a roller ball pen, and a fountain pen.

12. A data storage diskette comprising:

a diskette housing defining:

first and second housing sections, an exterior portion of at least one of the housing sections integrally forming an information field that defines a texture having a surface roughness in the range from 100 to 250 micro-inches, an icon formed on the housing indicating that the information field is receptive to hand written indicia; and a media disk enclosed within the housing.

13. The data storage diskette of claim 12, wherein the diskette housing has a surface energy characterized by a surface tension value of greater than 35 dyne/cm.

14. The data storage diskette of claim 12, wherein the information field includes at least one demarcation adapted to guide an orderly placement of indicia onto the information field.

15. The data storage diskette of claim 14, wherein the at least one demarcation projects above the information field.

16. The data storage diskette of claim 14, wherein the at least one demarcation is a dashed line.

* * * * *